United States Patent
Falconer

[15] 3,654,802
[45] Apr. 11, 1972

[54] MEASUREMENT AND CONTROL APPARATUS

[72] Inventor: David G. Falconer, 3931 Benton St. N.W., Washington, D.C. 20027

[22] Filed: May 11, 1970

[21] Appl. No.: 36,135

[52] U.S. Cl. ............................................................73/37.5
[51] Int. Cl. ...........................................................G01b 13/00
[58] Field of Search ......................73/37, 37.5, 37.6–37.8, 73/37.9; 33/DIG. 2

[56] References Cited

UNITED STATES PATENTS

| | | | |
|---|---|---|---|
| 2,019,514 | 11/1935 | Masten | 73/37 |
| 2,398,958 | 4/1946 | Pellettere | 73/37.5 |
| 3,194,055 | 7/1965 | Knobel | 73/37.5 |

*Primary Examiner*—Louis R. Prince
*Assistant Examiner*—William A. Henry, II

[57] ABSTRACT

In a pneumatic measuring device of the leakage input type, a shaft of uniform diameter moves in a reciprocal manner within a conformably shaped bore. The shaft and the bore are substantially of the same length so that if the shaft is moved axially the portion which is still encompassed by the bore is shortened. This annular passage between the shaft and the bore is used as a variable flow area. Pressure regulated compressed air on the upstream side of a line restriction is fed into a conduit which branches; one branch goes to a leakage input signal; the other branch goes to a chamber between the end of the shaft and the end bore; this chamber is closed except for the annulus. Opposing the movement of the shaft is either a weight (when the shaft and bore are pointed vertically) or a pneumatic cylinder. If the leakage input is varied the flow to the chamber between the shaft and the bore varies. As the pressure forces the shaft to move the annulus shortens, thereby admitting more flow until the force moving the shaft (the pressure X the area) is equal to the opposing force of the pneumatic cylinder or the weight. The output of the device is the axial movement of the shaft with sufficient power to operate switches and like operations.

In another species of the invention a tapered piston is fitted into a like tapered bore. As the tapered piston is moved axially in the tapered bore the annulus between them is widened to vary the flow.

14 Claims, 10 Drawing Figures

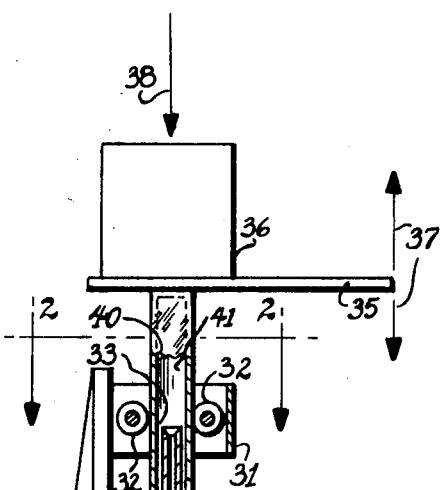
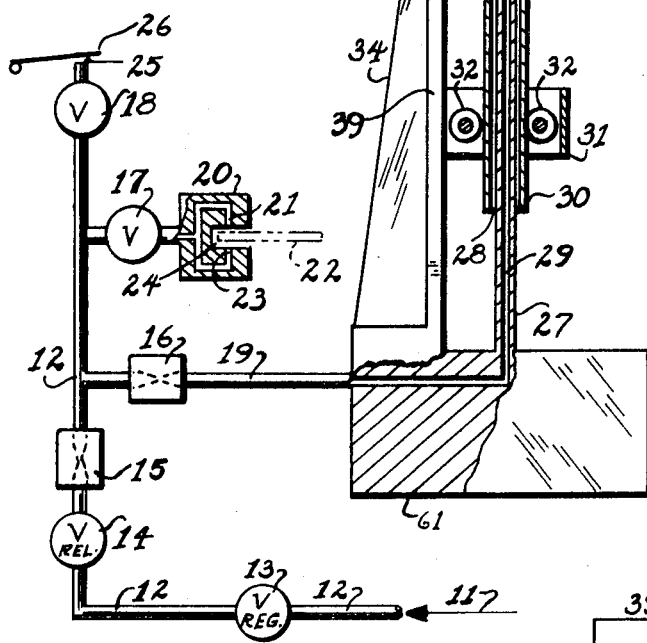
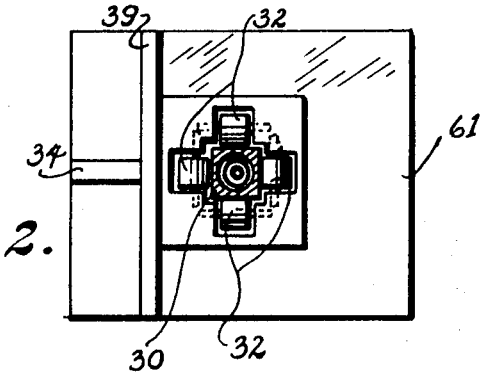

MEASUREMENT AND CONTROL APPARATUS

BACKGROUND OF THE INVENTION

Measurement of small distances or measurement of the size of an object has been known for 40 years by making the leakage around the object to be measured part of a circuit, in which case, the measuring instrument is either a manometer to sense pressure back-up or a tapered glass tube with graduations for sighting the position of a light-weight float which is placed within the tapered glass and which rises to balance with its weight the force of the air pressure by opening the annulus area to admit more flow.

The inventions in the prior art are highly accurate but they develop only enough force to operate a sight gage and not enough to do useful work such as positioning or operating switches to reject or print a permanent record. The prior art also has a limited range of movement because, fundamentally, they are bound to the fact that a round orifice is a useful measurement for only one-fourth of its diameter (at which point the flow area equals the diametrel area); beyond this there is no throttling effect.

The present invention overcomes both of these shortcomings.

SUMMARY OF THE INVENTION

In the simplest species of this invention a base supports a vertical straight shaft, having a smooth, ground, diameter; a hole for the air supply is drilled the full length of the shaft and this air passage connects to a conduit in the base. A long sleeve, having a long bore, a few thousandths of an inch larger than the shaft and having a cover on one end of the bore (a blind bore) is dropped down over the shaft. The outside of the sleeve is guided by anti-friction bearings so that reciprocal movement of the sleeve relative to the shaft is sensitive and uniform and so that a constant space is maintained between the sleeve and the shaft. A weight or a pneumatic cylinder into which compressed air at regulated pressure is admitted counteracts the force of the shaft. The foregoing is a description of the basic structure; a description of the circuit and operation of the device follows.

Compressed air at a very accurately regulated pressure level is piped upstream to a line restriction. Downstream of this restriction the pipe branches, one branch connecting to the hole through the shaft and thence to the blind end of the bore, the other branch ending in a leakage control device or orifice. If the leakage control is closed the compressed air will take the only course left open to it and press against the blind bore. As the sleeve rises the portion of the shaft in the bore shortens; the annulus, in other words, shortens. More flow is allowed through the shortened annulus. The sleeve will continue to move outward until enough flow escapes through the shortened annulus to reduce the backed up pressure to equilibrium with the counteracting weight or the force provided by the counteracting pneumatic cylinder.

The rise of the sleeve is fully modulated and commensurate with the position of the leakage control. The flow through the annulus is a function of the back-up pressure and the length of the annulus. The leakage measurement is, thus, the small input and the powerful movement of the sleeve resulting from the large pressure drop of the long, narrow, annulus is the output.

To the end of the sleeve is attached an arm or power take-off, to which may be attached a variety of different end-result devices.

In another species of the invention, sometimes used in conjunction with the previous species, a tapered shaft is fitted into a tapered bore in a housing. The circuitry is similar to the previous species. Axial movement of the tapered shaft varies the width and therefore the flow area between the tapered shaft and the tapered bore.

In a third species a structure is made similar to the first species described except that the blind bore has a small conduit leading from the bore through the arm or power take-off and ending in a control orifice at the end of the arm. The compressed air supply goes directly from the regulator, through a restriction, and then into the bore via the hole in the shaft, without branching off to a leakage control.

Thus, the only leakage control is in the end of the arm, usually the bottom of the arm. If a part to be measured approaches and closes this orifice the sleeve pressure chamber will have backed up pressure inside which will cause the arm to retreat and not actually contact the part being measured physically. The gap resulting may be controlled and predetermined by adjusting the counteracting weight or the counteracting pneumatic cylinder pressure.

In another species of the invention a piston which in cross-section is square is fitted into a groove of like cross-sectional shape. In this species the axis of the piston and its mating, encompassing, structure are not rectilinear; the longitudinal axis is a circle. The piping and circuitry are analogous to the other species. An annulus is machined into a block for 180° and a conforming piston fits in this annular groove. The movement of the piston describes a circle, therefore. A cable attached to the end and outer rim of the piston is attached to the shaft of an opposing pneumatic cylinder at its other end.

BRIEF DESCRIPTION OF THE DRAWINGS

FIG. 1 is a side view of the simplest form of one species of the invention with a portion in broken-away section.

FIG. 2 is a section taken at 2—2 of FIG. 1.

Figure 3:
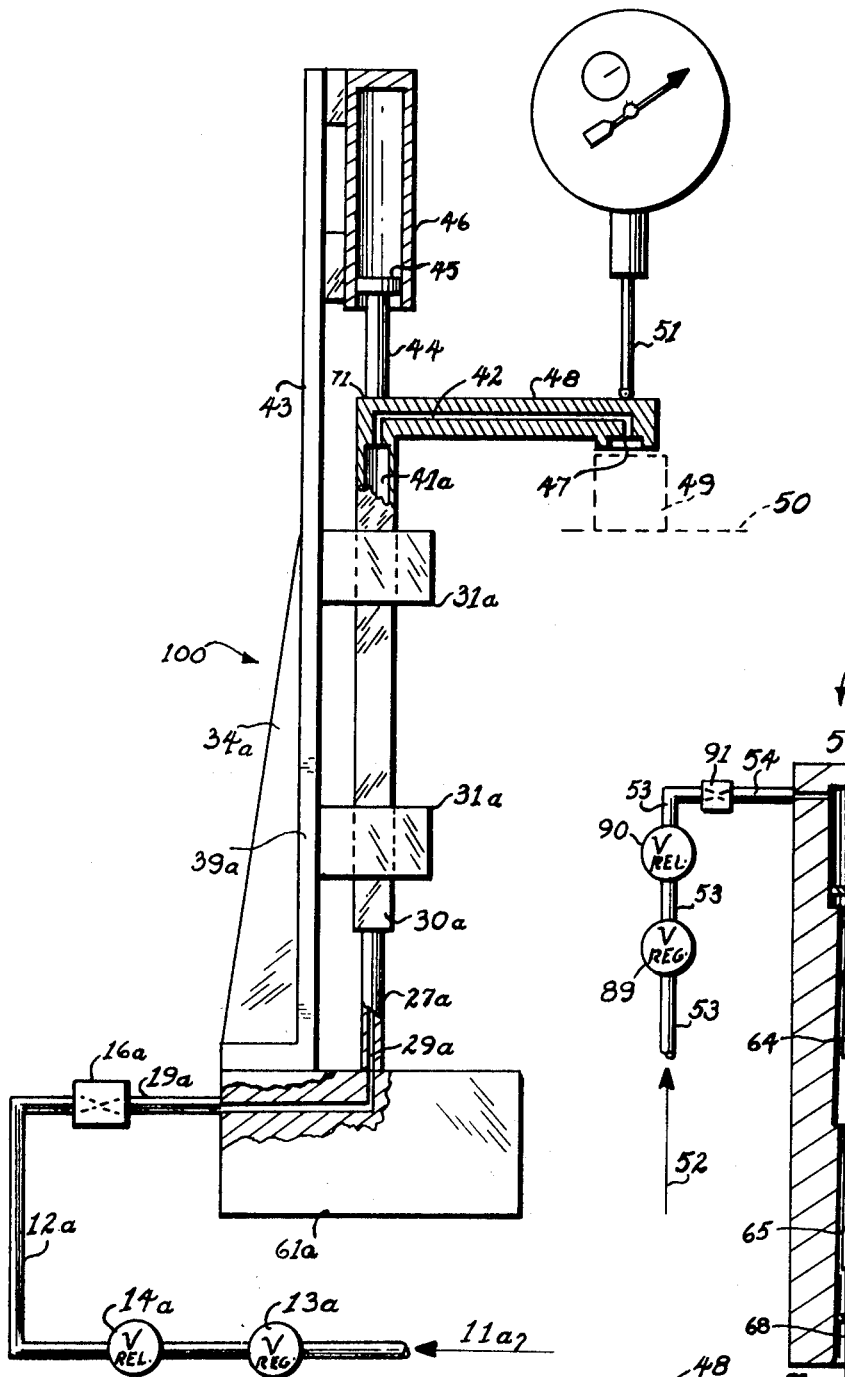
FIG. 3 is a side view of a more elaborate species of the invention with partial sectioning.

DETAILED DESCRIPTION OF THE INVENTION.

With reference to FIG. 1 and FIG. 2 a frame or chassis is shown, comprising a base 61, an upright member 39, and a supporting stiffener or gusset 34, for the upright member. Attached to the upright member are a pair of bearing blocks 31. These blocks 31 are each fitted, as can be seen without elaboration, with four rollers 32. The faces of the rollers 32 must be made to align as precisely as possible because upon them depends the accuracy of the device. A long, straight, sleeve 30 is shown which reciprocates in a path which is guided by the rollers 32 just mentioned. These rollers are contiguous to the four flat sides of the sleeve 30. The sleeve is bored so as to drop down over a vertical shaft 27 which is fastened to the base 61 and is in precise alignment with the bore 41 of the sleeve 30 and the outer sides of the sleeves. The upper end of the bore is blind or blocked off. The broken-away sectioning 40 shows the shaft 27 having a hole 29 for compressed air through its entire length. Compressed air entering this hole 29 from a conduit 19 fills the bore 41 and escapes through the long narrow annulus 33 between the shaft and the bore and leaves the bottom end of the annulus 28 to enter the atmosphere. On top of the sleeve there is a platform 35 which extends outboard to the right. This platform is secured to the top of the sleeve and supports a weight 36 which, naturally, serves as a constant, counteracting force in the direction of the arrow 38 against any upward thrust of the sleeve caused by the compressed air in the bore. The function of the outboard arm of the platform 35 is that of a power take-off. As the arm moves according to the arrow 37 it can operate switches, printers, etc.

The order of parts could be changed, i.e., the sleeve could be stationary while the shaft reciprocates. The same principles of elongating and shortening the flow annulus obtain but the shaft, which may be quite slender would have bending upon it because of work loads and also guiding bearings would wear the flow surfaces.

The air circuit and the functioning of the device may be described as follows: A source of clean, dry, compressed air 11 enters the conduit 12 to a balanced valve pressure regulator 13. In practice it is best to have two regulators in series to minimize the effect of upstream fluctuations on the regulated pressure. A relief valve 14 and a variable restriction valve 15 are placed in series in line 12. The conduit 12 then bifurcates, one branch going through another variable area restriction 16, thence becoming conduit 19 and entering the measuring device. The conduit 12 in its other branch goes to an off-on valve 17 and another off-on valve 18.

From the valve 18 a short pipe leads to a control orifice 25 and its flapper type closure 26. The valve 17 leads through a short pipe to a thickness measuring device 20 which is shown in section. In this device, old to the art, the conduit from the valve 17 divides, one branch ending in an orifice 23 and the other in an orifice 21 opposed to it. A slot 24 is formed for the admission of the part 22 to be measured.

If the valve of numeral 17 is closed and the other valve 18 is open the sleeve 30 will rise and fall in proportionate distance to the throttling position of the flapper valve 26 over the orifice 25, because, all other controlling factors remaining constant, the flow from the bore 41 through the annulus is proportional to the length of the annulus. The weight 36 regulates the pressure in the bore for as the air pressure builds up in the bore above the force exerted by the weight, the weight rises to a point at which the annulus shortens sufficiently to relieve the pressure to the valve: pressure X effective area = weight force.

At least, when using a weight as an opposing force the restriction 16 must be in the line to present a simple harmonic system. Because of inertia forces, a weight is not an ideal opposing force. The purpose of FIG. 1 is to explain the functions.

If the valve of numeral 17 is open and the valve of numeral 18 is closed the device functions in the same manner as just described except in response to the thickness of the part being measured 22.

If gas pressure in small flows is admitted directly into the conduit 19, that is, without going through or working in conjunction with the other components such as the flapper valve 25 and the measuring device 20, etc., the species of FIG. 1 becomes an effective relief valve. The blind end of the bore can drop down to close the orifice at the top end of the shaft 27. In an experimental model this has been used for the relief valve 14.

If pressure-regulated compressed air upstream of a restriction is directed on the downstream side of the restriction into the conduit 19 and into the bore 41 the device can be turned into a spring following Hookes' Law for a good percentage of its travel. It is then a scale of a force measuring device having an adjustable constant—adjustable because the regulated pressure above the restriction can be raised or lowered.

In FIG. 3 the essential parts of FIG. 1 can be easily recognized in which the identifying numerals have had a suffix "a" added, wherever possible,-the base 61 of FIG. 1 becoming the base 61a of FIG. 3, etc. In FIG. 3 the upright member 39a has been lengthened, the lengthened portion 43 having a pneumatic cylinder 46 (seen in section) fastened to it. Regulated air pressure works against the piston 45 which in turn transmits force and motion through the shaft 44 to impinge on the top of the sleeve 30a at the numeral 71. An arm 48 extends outboard from the sleeve. The arm contains a conduit 42 which starts at the blind end of the bore 41a and ends in a downward oriented orifice 47.

In this species pressure regulated compressed air enters upstream of the restriction 16a. After passing through this flow restriction the compressed air enters the bore 41a via the conduit 19a and the hole 29a in the shaft 27a. If a part to be measured, the workpiece 49, is held on a firm foundation 50 which is fixed relative to the instrument base 61a the arm 48 will be urged downward because of force of the pneumatic cylinder 46. An adjustment is made in the regulated pressure in the pneumatic cylinder 46 so that the arm will not actually contact, physically, the workpiece 49 but will travel until all but 0.001 inch distance, e.g. to the workpiece has been traveled. A dial gage 51 to indicate distance may be used. While this device gages the thickness of the workpiece without physical contact and wear from contact the dial indicator must still be read and the range of measurement is still confined to a travel of less than one-quarter of the gaging orifice diameter.

Figure 4:
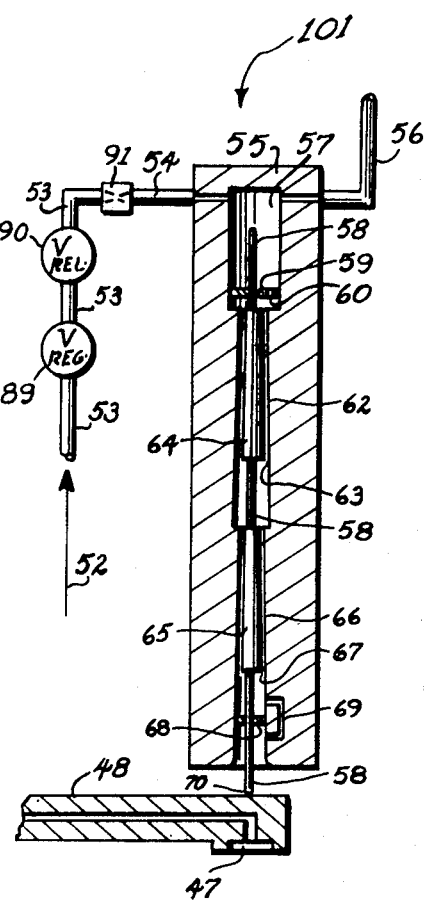
FIG. 4 is a section taken on the long axis of another species of the invention.

Use of the species of FIG. 4 (hereafter identified by the numeral 101) in conjunction with the species of FIG. 3 will increase the range as well as change the output from a dial which must be read to an output of sufficient power to do considerable work. If this species replaces the dial indicator 51 of FIG. 3, a shaft 58 contacts the arm 48 at numeral 70 in FIG. 4. This shaft 58 is supported and guided by the bearings 59 and 68. Mounted on the shaft concentrically are two tapered pistons 64 and 65 which reciprocate in conforming tapered bores 62, and 66, respectively. Between each tapered piston and mating tapered bore a highly effective annulus 63 and 67 is formed. They are more accurate and dependable as variable area flow devices than a tapered pin inserted into a sharp edge orifice; any manufacturing errors in dimensions and surfaces tend to "average out" because of the length of the annulus. They are highly restrictive of flow and are, therefore, economical of air consumption. I have used this tapered piston structure in two previous U.S. Pats. (Nos. 2,880,959 and 3,147,668) but with different functions and pneumatic circuitry. The housing 55 shows an inlet 54 entering a bore 57 and an outlet conduit 56 leaving the bore. A source of compressed air 52 is conducted through a pipe 53 to a balanced valve regulator 89; the pressure regulated air downstream of this regulator goes to a pressure relief valve 90 and then through a variable restrictor 91 and then into the chamber 57. Compressed air can escape from the bore 57 by going through a hole 60 in the shaft bearing 59, through the annulus 63 between the first tapered piston 64 and the tapered bore 62. Finally the air escapes through the second annulus 67 and through a by-pass conduit 69 around the shaft bearing 68 and then the atmosphere. A force, such as the arm 48, when changing position, restricts the flow through the annulus 63 and the second annulus 67 proportionately to the distance the shaft 58 has been moved; the pressure in bore 57 will increase if the flow in the pipe 56 is restricted below flow area of the restriction 91 plus the annulus flow capacity.

If the outlet pipe 56 is not so restricted then the flow through the pipe 56 will vary as the position of the shaft 58.

Figure 5:
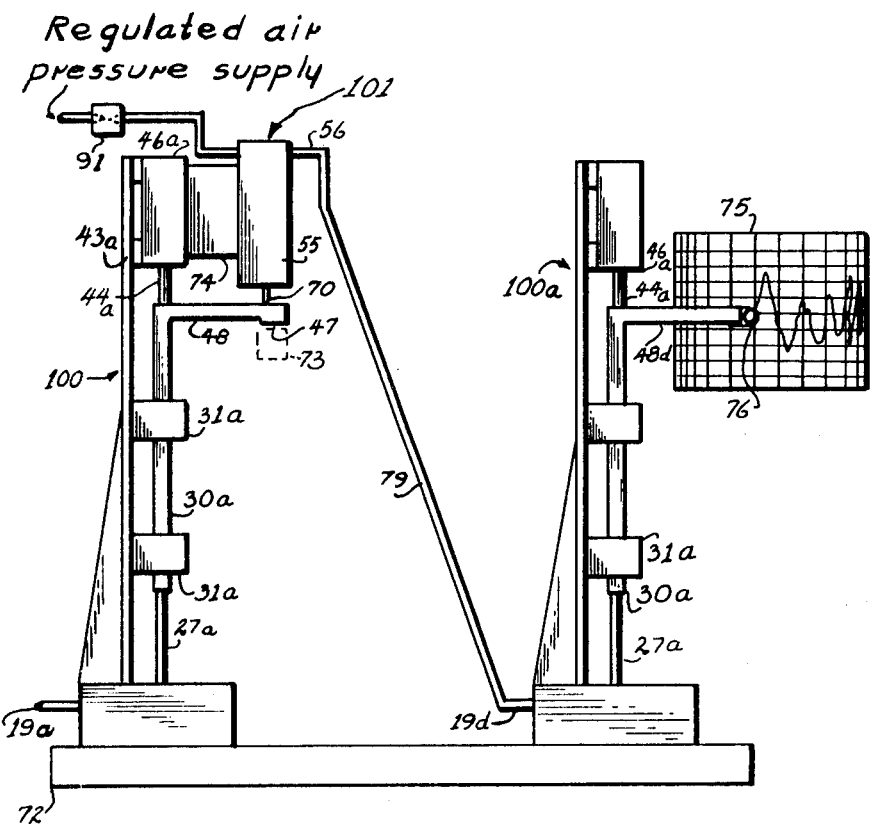
FIG. 5 is a side view of an elaboration of several species of the invention used in conjunction with each other.

In FIG. 5 the device 100 (of FIG. 3) is shown. A support bracket 74 has been added; this bracket is attached in any convenient and rigid manner (not shown) to the frame 43a of the device 100. The other end of the bracket 74 is attached to the housing 55 of the device 101. In operation, as the piece being measured 73 causes the arm 48 to back away the determined gap or distance from the workpiece and consequently presses the end 70 of the sensing device 101 to increase the flow through the outlet pipe 56. (Since as already described, pushing inward closes the annulus so that the compressed air must take the only other course open to it—through the outlet pipe 56.). The conduit 56 then connects via a long pipe 79 to the inlet 19d of an instrument 100a similar to the device 100. Both of these devices 100 and 100a are mounted on a common bore 72. The second device differs from the first device in this compound unit in the following respects: the device 100a has no orifice 47 and its arm 48a has a stylus or pen 76 mounted on the end of the arm (pointed away from the reader). The stylus writes or records on a drum or roll type graph. If it be imagined that the workpiece 73 is a long rod or sheet and is moving toward the reader then the drum or roll type graph 75 will be moving to the right at the same surface speed as the workpiece.

The sensing device 101 can amplify a ¼ inch or ¼ inch movement into 12 inches when used in a compound device of this kind readily, whereas, an orifice of 0.010 inch would have less than 0.0025 inch range.

Figure 6:
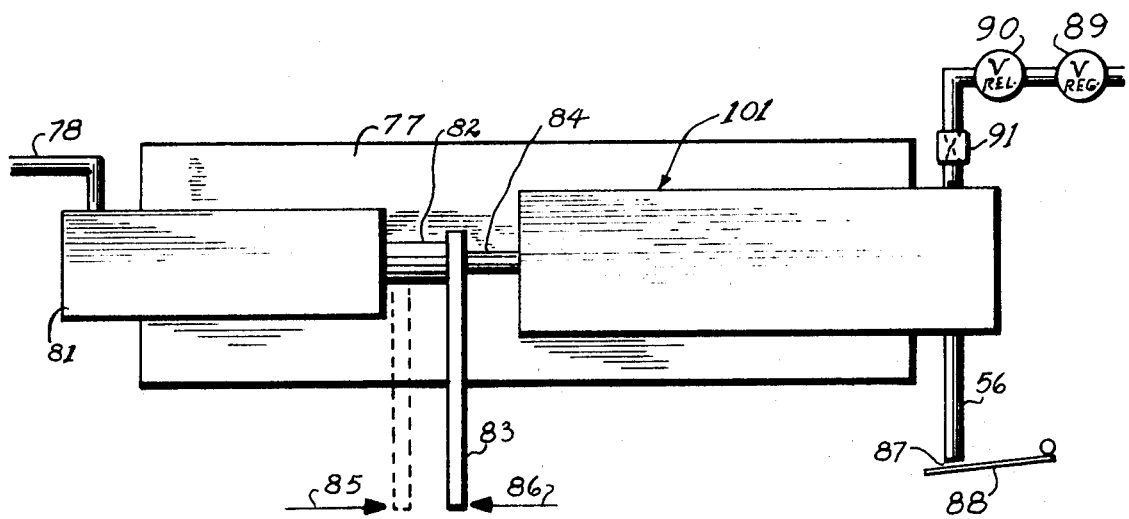
FIG. 6 is a plan view of another species of the invention.

In FIG. 6 the device 101 of FIG. 4 is mounted on a base 77. This sensing device 101 is here used as an amplifier standing alone. The force of this unit is counteracted by a pneumatic cylinder 81 having a regulated supply of compressed air in the inlet 78. The cylinder 81 is mounted also on the base 77. The cylinder shaft 82 is fixed to the power take-off arm 83. The shaft 58 of the sensing device 101 impinges against the arm 83. As the flapper valve 88 closes the orifice jet 87 from the conduit 56 the arm 83 moves a proportional distance. Movement amplitude indicated by the arrows 85 and 86 may not be as great as in the straight piston type and it uses more compressed air but it is very responsive and simple to make. The supply of compressed air through the valves 89, 90 and 91 was already described in connection with FIG. 4.

Figure 10:
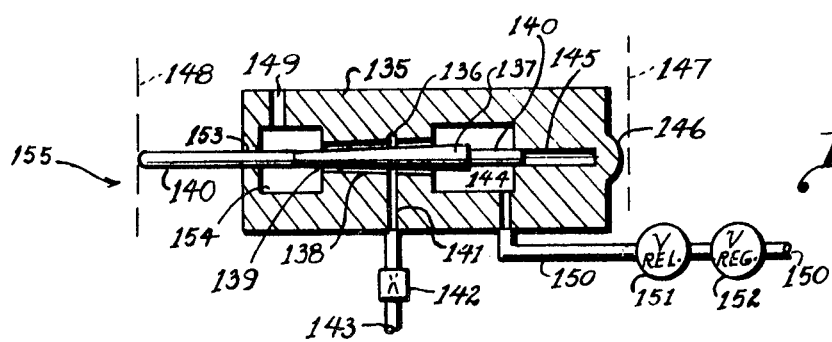
FIG. 10 is a section taken along the long axis of another species of the invention.

The device 155 of FIG. 10 will be described here because it is applicable as a substitute for the sensor 101 of FIG. 5. The shaft 140 of this device would impinge against the arm 48 of FIG. 5 instead of the shaft end 70 of the sensor 101. The whole device 155 would be mounted in place on the bracket 74 in FIG. 5. In FIG. 10 a housing 135 comprises a shaft bearing 153, another shaft bearing 145 at the opposite end. A shaft 140 reciprocates in these bearings. Mounted concentrically on the shaft is a tapered piston 137 which fits into the mating tapered bore 138. Between the tapered bore and the tapered piston is the annulus 139. An annular ring 136 is turned into the tapered bore 138; this annular ring 136 serves as a collecting ring for the conduit 141 which leads through a restriction 142 in the line and then out through conduit 143. A chamber 154 and a conduit 149 serve as vents to the outside. A hardened button 146 is placed at one end of the housing; since this sensor 155 can also be used as an inside micrometer this button 146 contacts one wall of the workpiece 147 and the end of the shaft 140 contacts the other wall 148 of the housing. A compressed air source in the pipe 150 goes through a balanced valve pressure regulator 152 and then to a relief valve 151 and finally into the upstream chamber 144. The operation of the sensor 155 is as follows: The annulus 139 at the small end of the tapered bore 138 will always be smaller in area than the annulus at the large end, naturally, so that compressed air will always fill the annulus and the ring 136 and the pipe 141. (The tapered piston is prevented from seating in metal to metal contact.). If the shaft 140 is moved to the right the pressure upstream of the restriction 142 will be raised; the flow in the pipe 143 will be proportional to the distance the shaft 140 is moved. When this sensor 155 is used as a replacement the sensor 101 in FIG. 5 the pipe 143 will connect to the conduit 79 of FIG. 5.

Figure 7:
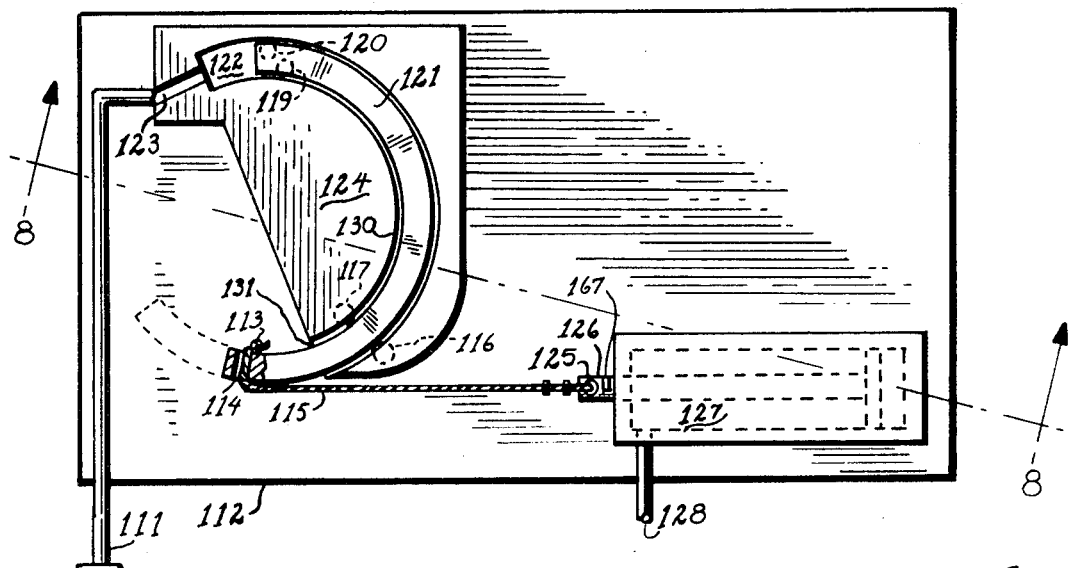
FIG. 7 is a plan view of a rotary adaptation of the invention with the top cover removed shown with the cover 129 of FIG. 8 removed.
Figure 8:
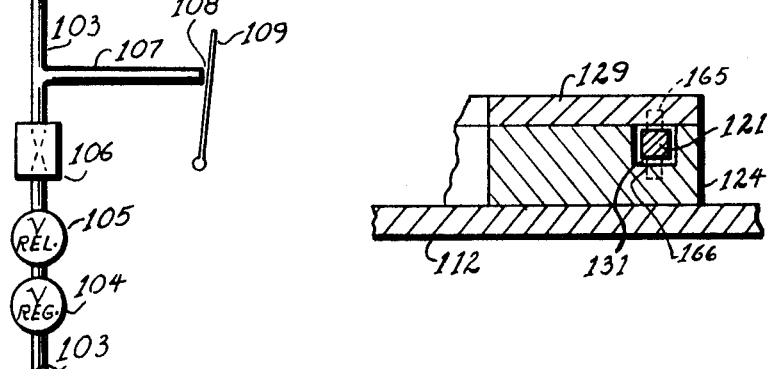
FIG. 8 is a portion taken at 8—8 of FIG. 7. This FIG. shows the cover 129 replaced.
Figure 9:
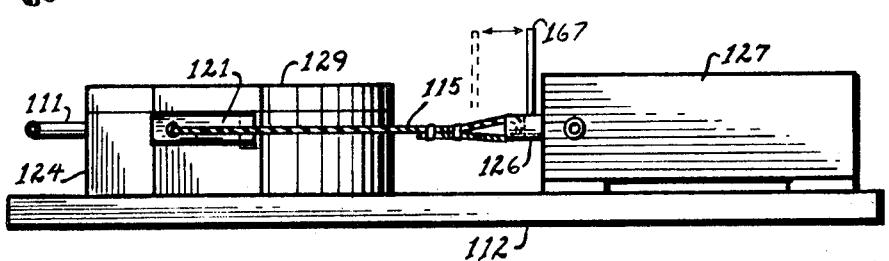
FIG. 9 is a side view of FIG. 7 including the top cover.

In FIGS. 7, 8, and 9 a housing 124 encloses a bore 122 which is square in cross-section and is formed about a circular longitudinal axis. A shaft 121 conforms to this bore and rests inside of it while allowing a uniformly thick space 131 all around the circular shaft. Roller guides 165 and 166 maintain the space between the circular shaft 121 and the bore 122 with respect to the vertical position as seen in FIG. 8, while rollers 119, 120, 116 and 117 maintain proper radial alignment. As stated before the cover 129 in FIG. 8 was removed in FIG. 7; this cover is simply a flat plate which is sealed to the housing 124. A pull type pneumatic cylinder 127 is fastened to the base plate 112. The shaft 126 of the cylinder has a rounded edge smooth hole 125 for fastening a cable 115. The cable is looped through a similar hole 114 in the end of the circular shaft 121 and knotted 113. Compressed air enters the pipe 103, goes next through the pressure regulator 104, the relief valve 105, the restriction 106, after which the pipe 103 branches, one going through the restriction 110 and into the bore 122 via the conduit 111 and 123. The other branch 107 leads to any type of leakage control device, in this case an orifice 108 and a flapper valve 109. The operation of this device and that of FIG. 1 is identical except for the fact that here the shaft is circular instead of straight. Therefore it will not be described here. As can be seen in FIG. 7 the cable 115 is on a tangential line to the outer circumference of the circular piston 121 so that regulated compressed air entering the cylinder 127 through the inlet 128 counteracts the rotary force of the circular shaft 121. The power take-off arm 167 is shown as a rod attached to the cylinder shaft 126 but it could as well be attached to the end of the circular shaft 121.

While this invention was intended to be pneumaticaly operated it could be hydraulicaly operated and would perform to a limited range; viscosity effects alone would be enough of a problem.

It will be obvious to those skilled in the art that various changes may be made in the invention without departing from the scope and spirit of the invention; therefore the invention is not limited by that which is shown in the drawings and described in the specification but is to be determined from the appended claims.

What is claimed is:

1. In a pneumatic or hydraulic device for measurement and control, a shaft which is straight and of substantially constant diameter or width, a sleeve having an open end and an opposite closed end, the interior of said sleeve conforming in shape to said shaft but being slightly larger and uniformly larger in diameter or width than said shaft and ensheathing said shaft, bearing and guiding means provided which govern said sleeve to move in reciprocal motion relative to said shaft along the long axis of said shaft and said sleeve, said bearing and guiding means maintaining a constant clearance between the sides of said shaft and the adjacent interior walls of said sleeve, said constant clearance forming a variable length flow passage upon relative axial displacement occurring between said shaft and said sleeve as the portion of said shaft ensheathed by said sleeve varies in accordance with said relative axial displacement, a closed end chamber being formed within the confines of said closed end of said sleeve and the interior walls of said sleeve and the end of said shaft which is ensheathed in said sleeve, a conduit leading compressed gas or fluid into said closed end chamber, the fluid or gas pressure within said closed end chamber tending to push said shaft and said sleeve apart, a counter-force provided to force said sleeve and said shaft together, whereby if the force developed from gas or fluid pressure in said closed end chamber is not equal to the said counter-force said sleeve and said shaft move relatively to each other in said reciprocal motion and consequentially the said variable flow passage changes length to alter the escape of gas or fluid from the said closed end chamber until a force balance obtains between said counter-force and the pressure force developed in said end chamber, whereupon the said reciprocal motion and the resulting axial positioning of the said sleeve relative to said shaft is the output and control of the said force balance is the input of the said device, and motion take-off means for coupling the said output to an external load is provided.

2. Pneumatic or hydraulic device as claimed in claim 1 wherein means is provided for conveying gas or fluid at constant pressure into the inlet of an area restricting orifice and wherein said area restricting orifice empties said gas or fluid into said closed end chamber of said device.

3. Pneumatic or hydraulic device as claimed in claim 2 wherein an orifice control input device communicates from said closed end chamber to the outside area of said device and means is provided to control the escape of said gas or fluid from said orifice control input device.

4. Pneumatic or hydraulic device as claimed in claim 3 wherein said orifice control input device is mounted in connection with said motion take-off means in such manner that said orifice control device is in unison with said reciprocal motion so that when said orifice control device is throttled to within a pre-set magnitude said motion take-off means is positioned according to the throttling of said pre-set magnitude.

5. Pneumatic or hydraulic device as claimed in claim 3 wherein said orifice control input device is mounted in connection with said motion take-off means in such manner that said orifice control input device is in unison with said reciprocal motion so that when an object blocks the said orifice control input device to within a pre-set distance said motion take-off means is positioned at said pre-set distance.

6. Pneumatic or hydraulic device as claimed in claim 5 wherein said motion take-off means operates an auxilliary amplifier, said auxilliary amplifier comprising an inclined or tapered surface which is caused to be moved or to be positioned in unison with said reciprocal motion and with said motion take-off means, said inclined or tapered surface being adjacent to a control orifice which regulates the escape of gas or fluid, said control orifice regulating thereby the controlling pressure to another measuring device.

7. Pneumatic or hydraulic device as claimed in claim 2 wherein means is provided to convey gas or fluid into said closed end chamber of said device, whereupon the said reciprocal motion and the said resulting axial positioning of the said sleeve relative to said shaft is a measure of the magnitude of the said counter-force.

8. Pneumatic or hydraulic device as claimed in claim 1 wherein means is provided to convey gas or fluid into said closed end chamber of said device whereupon the said reciprocal motion and the said resulting axial positioning of the said sleeve relative to said shaft serves to relieve over-pressure in said closed end chamber of said device said over-pressure being determined by the magnitude of force set by said counter-force.

9. In pneumatic or hydraulic device a housing comprising a generally closed end chamber, inlet provided for conveying gas or fluid into said generally closed end chamber, outlet provided for conveying gas or fluid out of said generally closed end chamber, a tapered chamber communicating with said generally closed end chamber, a tapered piston substantially conforming in shape to and fitted inside of said tapered chamber, means provided to guide said tapered piston in relative axial alignment with said tapered chamber and to provide said tapered piston with reciprocal movement relative to said tapered chamber, axial transmission means and axial force and counter-force means provided to transmit axial movement to and to receive axial force from said tapered piston, said axial transmission means adapted to be connected to an extraneous device, the space between said tapered piston and said tapered chamber forming a variable flow annulus serving to vary the flow of gas or fluid from said generally closed end chamber proportionately to axial positioning of said piston, venting means provided for said variable flow annulus at opposite end of said tapered piston from said generally closed chamber, said inlet being provided with constant inlet pressure restriction means, whereupon, if the escape of gas or fluid is controlled from said outlet as input function said outlet is the input of said pneumatic or hydraulic device and the resulting positioning of said axial transmission means is the output of said pneumatic or hydraulic device, but, if said axial transmission means is positioned as the input function, then said axial transmission means is the input of said pneumatic or hydraulic device and said escape of gas or fluid from said outlet is the output of said pneumatic or hydraulic device.

10. Pneumatic or hydraulic device as claimed in claim 9 in which more than one said tapered piston is fitted and guided in the same number of tapered chambers, said tapered chambers, each, being like said tapered chamber of claim 9 and in which each said tapered piston is joined together to said axial transmission means.

11. In pneumatic or hydraulic device a housing comprising a chamber shaped in the manner of an annulus, hereinafter called annulus, said annulus ensheathing a piston shaped to conform substantially to said annulus, said piston provided with bearing and guiding means to allow the said piston to have reciprocal circumferential movement within said annulus and upon a substantially common radial axis to said annulus, said annulus extending less than 360° of a circle, said annulus having one generally closed end, hereinafter called closed end chamber, said closed end chamber having inlet for gas or fluid and inlet control means, said annulus having an open end arcuately opposite said closed end chamber so that said piston fitted in said annulus can move reciprocally or extend partially out of ensheathment by said annulus through said open end, gas or fluid in said closed end chamber tending to push said piston circumferentially out of ensheathment by said annulus, a counter-force means provided tending to push said piston back into said ensheathment of said annulus toward said closed end chamber, the space between the outer walls of said piston and the corresponding inner walls of said annulus forming a variable length flow passage proportional to the extent of that portion of the said piston being ensheathed by said annulus, whereupon, if the force developed by gas or fluid pressure in said closed end chamber is not equal to said counter-force said piston moves circumferentially and reciprocally until said variable length flow passage is altered in length until a force balance obtains between the force generated by the gas or fluid pressure in said closed end chamber and said counter-force, whereby said piston is positioned and power and motion take-off means is provided to an external work load or use.

12. Pneumatic and hydraulic measuring device as claimed in claim 11 wherein said housing is provided with connected contact means to sense said subject or object to be measured, said connected contact means being used to contact opposite end or side of said subject or object to be measured from said movable contact means.

13. In pneumatic or hydraulic measuring device a housing comprising gas or fluid inlet, hereinafter, inlet, gas or fluid supply provided through said inlet, movable contact means provided to sense relative distance of object or subject to be measured from said housing, guiding means provided to guide said movable contact means with respect to said housing, inclined surface valve closure means connected with said movable contact means, said inclined surface valve closure means forming an acute angle with respect to axis of movement of said movable contact means, gas or fluid outlet, hereinafter, outlet, provided, said inlet and said outlet being formed to have joint communication means with each other and being jointly controlled by said inclined surface valve closure means, whereby, as said inclined surface valve closure means is positioned to variably close off said gas or fluid from said said outlet and said inlet joint communication means, said gas or fluid is forced into said outlet proportionally to relative position of said inclined surface valve closure means, hence, the output of said pneumatic and hydraulic measuring device is the flow of said gas or fluid from said outlet and the input of said pneumatic and hydraulic measuring device is the movement or positioning of said movable contact means.

14. Pneumatic and hydraulic measuring device as claimed in claim 13 wherein said inclined surface valve closure means is a tapered piston slidably located and axially guided within like-shaped tapered bore.

* * * * *